United States Patent [19]
Yang

[11] Patent Number: 5,914,912
[45] Date of Patent: Jun. 22, 1999

[54] SONAR ARRAY POST PROCESSOR

[75] Inventor: Tsih C. Yang, Great Falls, Va.

[73] Assignee: United States of America, Washington, D.C.

[21] Appl. No.: 08/979,922

[22] Filed: Nov. 28, 1997

[51] Int. Cl.⁶ .................................................... G01S 3/86
[52] U.S. Cl. ........................................ 367/119; 367/103
[58] Field of Search ................................ 367/103, 119, 367/138

[56] References Cited

U.S. PATENT DOCUMENTS

| | | | |
|---|---|---|---|
| 4,420,825 | 12/1983 | Maynard et al. | 367/122 |
| 5,539,832 | 7/1996 | Weinstein et al. | 381/94 |
| 5,563,849 | 10/1996 | Hall et al. | 367/127 |
| 5,581,495 | 12/1996 | Adkins et al. | 364/724.16 |
| 5,680,371 | 10/1997 | Miklovic | 367/103 |

OTHER PUBLICATIONS

Feuillade; Environmental Mismatch in Shallow–water Matched–Field Processing, Geo Acoustic parameter variability, J. Acoust., Sec. Am. View 85, No. 6, pp. 2359–2364, Jun. 1989.

Ozard; Matched Field processing in shallow water for Range, Depth, and Bearing Determination: Results of Experiment and Simulation, J. Acous. Soc. Am; vol. 86, No. 2, pp. 744–753, Aug. 1989.

Yang; Modal Shading Coefficients for High–resolution Source Depth, Localization; J. Acoust. Soc Am.; vol. 87, No. 2, pp. 668–672, Feb. 1990.

Del Balzo; Effects of Water Depth Mismatch on Matched–field Localization in Shallow Water, J. Acoust. Soc Am.; vol. 83, No. 6, pp. 2180–2185; Jun. 1988.

Hanson et al., Environmental and System Effect on Source Localization in Shallow Water by the Matched–Field Processing of a Vertical Array; J. Acoust. Soc Am.; vol. 86, No. 5, pp. 1950–1959; Nov. 1989.

Knobles et al., Broadband Localization by Matched Fields in Range and Bearing in Shallow Water; J. Acoust Soc. Am; pp. 1813–1820; Sep. 1994.

Hanson; The Theoretical Responses of Vertical and Horizontal Line Arrays to Wind–Induced Noise in Shallow Water; J. Acoust. Soc. Am.; vol. 78, No. 5, pp. 1702–1712; Nov. 1985.

Ingenito; Scattering from an Object in a Stratified Medium; J. Acoust. Soc. Am.; vol. 82, No. 6, pp. 2051–2059; Dec. 1987.

Buckner; Use of Calculated Sound Fields and Matched–Field Detection to Locate Sound Sources in Shallow Water; J. Acoust. Soc. Am.; vol. 59, No. 2; pp. 368–373; Feb. 1986.

Shang; An Efficent High–Resolution Method of Source Localization Processing to Mode Space; J.Acoust. Soc. Am.; vol. 86, No. 5, pp. 1960–1964; Nov. 1989.

Knobles et al.; A Time Series Analysis of Sound Propagation in a Strongly Multipath Shallow Water Environment with an Adiabatic Normal Mode Approach; IEEE J. Ocean Engr.; vol. 21, No. 1; pp. 1–13; Jan. 1996.

Yang et al.; Acoustic Inversion of Bottom Reflectivity and Bottom Sound–Speed Profile; IEEE J Ocean Engr.; vol. 21, No. 4, pp. 367–376; Oct. 1996.

(List continued on next page.)

*Primary Examiner*—Ian J. Lobo
*Attorney, Agent, or Firm*—Thomas E. McDonnell; Charles J. Stockstill

[57] ABSTRACT

The sonar array post processor employs an adaptive processing, known as matched beam processing, in the beam domain which takes analog or digital conventional beamforming outputs from a sonar array, multiplies them by a set of adaptive weighting coefficients and produces a new set of beams. The new output beam of highest intensity yields the ideal maximum signal gain and correct target bearing. Continuous target tracking provided by the sonar array post processor in the endfire direction of a horizontal line array minimizes the towing ships maneuvers and for, a bottom mounted surveillance system, a smaller number of arrays are required.

8 Claims, 4 Drawing Sheets

OTHER PUBLICATIONS

Porter et al.; A Numerical Method for Ocean–Acoustic Normal Modes; J. Acoust. Soc. Am.; vol. 76, No. 1.; pp. 244–252; Jul. 1984.

Gingras et al., Inversion for Geometric and Gec Acoustic Parameters in Shallow Water; Experimental Results; J. Acoust. Soc. Am.; vol. 97, No. 6; pp. 3589–3598; Jun. 1995.

Porter; The Kraken Normal Mode Program; Na. Res. Lae. Rpt. No: NRL/MR/5120–92–6920, May 1992.

SONAR ARRAY POST PROCESSOR

BACKGROUND OF THE INVENTION

1. Field of the Invention

This invention pertains generally to acoustic beamforming in an underwater array and more specifically a technique for use in shallow water wherein a post processor utilizing matched beam processing takes conventional beamforming outputs and determines a set of beam weighting coefficients that are applied to the conventional output, thereby producing a new set of beams for the accurate determination of an underwater objects bearing, range and depth.

2. Description of the Related Art

Signal processing in underwater acoustics has been centered around the problem of detection and localization of a target or signal in an ocean waveguide. Detection and localization of a quiet target requires the use of an array of hydrophones as the array processing gain will enhance the signal-to-noise (S/N) ratio of the target. Standard array processing assumes that the signal arrives as a plane wave. Conventional beamforming uses the concept of delay and sum of received plane wave signals to estimate the target bearing. With the advent of matched field/mode processing it is possible to extend the detection range by exploiting the multipath arrivals of low frequency signals using, for example, a large aperture vertical or horizontal array. Improved signal gain is obtained because a matched field processing matches the data with signal propagation in the waveguide. Matched field processing may also be used for source localization. The parameter estimation aspect of the method has been extensively investigated. Assuming that the acoustic environment of the ocean is known and the signal can be modeled for all source ranges and depth of interest, the bearing, range, and depth of the target is estimated by the highest correlation point in the correlation ambiguity function. If the correlation is in terms of the mode amplitudes of the replica and data field, one has a matched-mode processing.

For a horizontal line array or spherical array, conventional beamforming has been widely used for detection and bearing estimation of a target. In the target look direction, the signals are delayed and summed to yield the highest beam power. The highest beam yields the target bearing if the dominant arrivals of the signal are contained in one beam, as when the target look direction is near the broadside of the horizontal array. Conventional beamforming has worked successfully in deep water.

Shallow water is a complex environment for array processing because of the many surface and bottom bounced returns in the signal. Using conventional beamforming, the multipath arrivals can split the signal in several beams when the target is at a non-broadside direction and cause signal gain to be less than ideal, i.e., 20 log of the number of sensors. In a low loss environment, many bottom bounced returns will arrive at the array at relatively high grazing angles and result in severe bearing bias when the target is away from the roadside direction.; as when the arrival angle of a dominant bottom path differs from the target bearing. Also detection range can be substantially reduced due to signal gain degradation. This occurs when the incoming signal is split into several beams associated with the various multipath arrivals.

Matched field processing applied to a horizontal line array would, in principle, correct these deficiencies. When applied to the real world, several factors must be considered. First, in many shallow water environments the bottom bathymetry and bottom properties can change substantially over a short distance. The water column sound speeds may be site dependent and can change substantially over minutes, hours, and days due to inhomogeneous oceanographic processes taking place in shallow water. Source localization in shallow water can be sensitive to small changes in the bottom sound speed profile. This defines the mismatch problem. Secondly, the bearing of a target is estimated only when the target is properly localized in range and depth. This presents not only a heavy demand on the on-board processing power but also an incorrect bearing when the target is falsely localized. Lastly, the majority of techniques currently utilized are based on conventional beamforming.

With respect to bearing estimation and source localization, for a non-vertical array, matched field processing must search for bearing, range and depth simultaneously. For horizontal arrays, the conventional priority is to estimate the target bearing first. Several readings of bearing can be used to estimate target location by triangulation using either an array at several headings or multiple arrays. The bearing estimation is more robust than range, i.e., it is less sensitive to environmental mismatch. The arrival angle on a horizontal array can be estimated using conventional beamforming without the exact knowledge of the sound speed profile in the water column. Arrival angles can be used to calculate the target bearing if the arriving multipaths are known. This transformation is nominally done by a sonar operator with a calculator.

With respect to noise, matched field processing processes noise by localizing individual noise sources, e.g., ships or wind generated noise. Matched field processing requires a large bearing-range-depth volume to delineate the different noise sources and hence involves heavy computations. It requires a large three-dimensional array in order to have high resolution in bearing-depth-range. For practical arrays, the sidelobes associated with the many different noise sources contribute and raise the noise background at the target bearing-range-depth cell. Matched field processing applied to a vertical array covering the full water column in a shallow water environment has a limited ability to reject surface generated noise, i.e., noise gain can be higher than that of conventional beamforming.

Adaptive beamforming is a variation of conventional beamforming which has found many uses in real life problems such as interference nulling. Adaptive beamforming and adaptive beam weighting, or filtering, can be incorporated naturally into matched field processing in the frame work of matched beam processing. The conventional approach with respect to highly directional interfering noise sources is to use adaptive beamforming which steers a null in the direction of the interfering noise sources. This is a simple and effective method for noise rejection. The problem with conventional adaptive beamforming is that the signal energy is split over several beams which applies equally to the interfering noise sources.

SUMMARY OF THE INVENTION

The object of this invention is to provide an apparatus that overcomes the problems of signal gain degradation and bearing bias encountered by conventional beamforming techniques in multipath shallow water environment, when the target is in a non-broadside direction.

This and other objects are achieved by the sonar array post processor which employs an adaptive processing, identified as matched beam processing, in the beam domain which takes analog or digital conventional beamforming (CBF)

outputs from a sonar array, multiplies them by a set of adaptive weighting coefficients and produces a new set of beams. The new output beam of highest intensity yields the ideal maximum signal gain and correct target bearing. This enables, for example, a towed aray to detect/localize a target/signal in the forward (edfire) direction, when CBF has problems Continuous target tracking provided by the sonar array post processor in the endfire direction of a horizontal line array minimizes the towing ships maneuvers and for, a bottom mounted surveillance system, a smaller number of arrays are required.

DESCRIPTION OF THE PREFERRED EMBODIMENT

Figure 1:
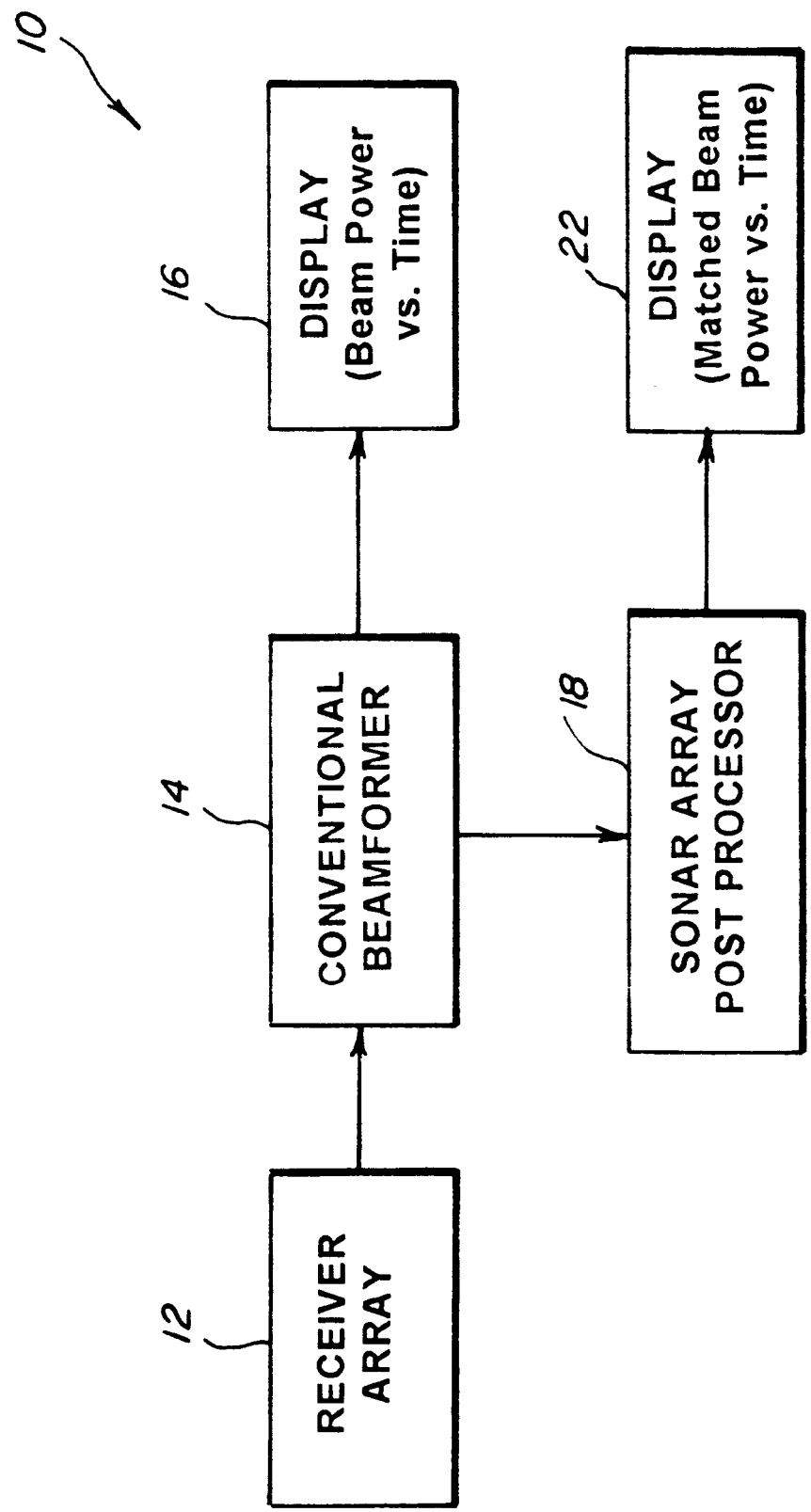
FIG. 1 shows a diagram of the sonar array post processor system in relation to the exising conventional beamforming processor.

In the sonar array processor system 10, as shown in FIG. 1, matched beam processing is applied to a horizontal line array in shallow water to achieve a more accurate determination of the bearing, range and depth of a target, in that order.

Matched beam processing (MBP) is a variation of matched field processing conducted in the beam domain. One assumes that the acoustic environment is given and that the signal field at the receiver array can be calculated. The receiver array 12 producing hydrophone data may be a horizontal array, a vertical array, or an array of an arbitrary type. MBP is a passive technique which starts with the conventional beamforming from a conventional beamformer 14, well known tho those skilled in the art, which nominally outputs conventional beam power plotted against time on a display 16.

A sonar array post processor 18, as described in this invention, utilizes the data derived by the conventional beamformer 14 and calculates complex beam outputs for a replica field and then correlates the data and replica beams for source localization and displays the matched beam power versus time on a display device 22.

The sonar array post processor 18 is implemented as a post processor to existing sonar systems using conventional beams as input. In the matched beam processing conventional beam outputs are multiplied by a set of steering vectors to form new beams. The steering vectors can be pre-calculated and stored in the cost-processor 18 when the ocean acoustical environment has minimal range variations. Matched beam processing deals only with beams. The algorithm utilized by the post processor 18 itself is independent of the array configuration whether it be a horizontal line array or a spherical array or else. The beam weighting coefficients will be dependent on the array configuration as well as the acoustic environment.

The sonar array post processor is a practical implementation of matched field processing. The advantages exploited by the sonar array post processor are summarized here. Some of the points are elaborated further.

Processing in the beam domain has certain advantages which are important for practical applications. The beam domain is nothing but a Fourier transform of the acoustic fields into the wavenumber domain. One recalls the advantage of processing time domain in the frequency domain; certain analogy can be drawn here. For a signal of limited bandwidth, frequency domain processing can be used to reject out of band noise. Likewise, when a signal arrives on a sonar array within a limited angular spread, beam domain processing can be used to reject noise in non-target directions.

Beam domain processing allows the possibility to search for target bearing, range and depth, in that order. The sequential search cues in on certain prior knowledge of the target (e.g., position, velocity, as in target tracking and results in orders of magnitude reduction in target detection and tracking as compared with simultaneous search in bearing, range and depth employed in matched field processing.

The sonar array processor is based on the physical principle that bearing estimation is more robust than range estimation. Note that the multipath arrival angles measured on a horizontal array can be used (e.g., by a sonar operator with a calculator) to calculate the target bearing if the multipaths are known. Target bearing estimation can be obtained without precise knowledge of the environmental parameters.

The sonar array processor, using the algorithm described below (the implementation in the FORTRAN® computer language is shown in Appendix 1 through 11) will automatically transform the conventional beam outputs associated with the multipath arrivals to yield a new set of beams pointing to the target which is essentially a coherent re-combination of the target beams. With certain prior knowledge, matched beam processing is able to estimate target bearing without knowing precisely the target depth and range. Hence for practical applications, the sonar array post processor will improve the existing array performance (in terms of signal gain and bearing estimation) in shallow water without requiring precise knowledge about the acoustic environment, as would be required by matched beam processing.

Noting that the signal arrival is usually confined to a small range of angles, only a small number of replica beams are needed to correlate with the beam data. A limited number of ranges and depths are used in the sequential search in each search step. In a phone domain, replica fields need to be calculated and stored for every phone on an array and for every target range, depth and bearing cell to be searched for. The array in practice often contains many phones (e.g., 50). Range search can expand over 10 km, depth covers several hundred meters, and bearing covers 360 degrees. Beam domain processing results in a significant reduction in memory and the follow-on arithmetic operations in the correlation process.

The replica field is calculated using a propagation code residing in the computer, based on the bathymetry, sound speed profile and bottom along the direction of the estimated bearing from the highest peaks of the conventional beam-forming output. A set of ranges and depths are used for the replica field. A predetemined set of depths are used based on the sound profile and likely depths for a target. Note that depth localization using a Bartlett processor is a smooth function of depth, hence the processor could state with a small number of depths (e.g., 5 depths up to 100 m) and refine the depth estimation later.

Working in the beam domain, the feature of adaptive nulling of interfering sources, which has been successfully demonstrated for a horizontal line array using adaptive beamforming algorithms, will be preserved in matched beam processing (see below). Adaptive processing can be applied to matched field processing. The interfering sources can be removed in adaptive matched field processing if the array has fine enough rsolution in the range-depth-bearing ambiguity volume. Using matched beam processing, the sonar array post processor uses the output of adaptive beamformer as currently used. The interfering sources are removed before the matched correlation process. This featur e is not available in matched field processing.

Lastly, beam domain processing offers a significant advantage in system detection analysis. To estimate the probability of detection and probability of false alarm for a detector, the probability distribution of the signal and noise at the output of the matched field processor is not known; the distribution often varies from one range-depth-bearing cell to another. The probability distribution of the signal and noise in the conventional beam domain is well studied both experimentally and theoretically. Hence a beam domain formulation speeds up the detection and estimation using prior research results.

The matched beam processor is described next. In matched beam processing, for a line array of N phones, a narrowband signal is propagated from a source to the receiver array using the KRAKEN normal mode code. See, M. B. Porter, *The KRAKEN Normal Mode Program*, NRL/MR/5120-92-6920, May 22, 1992, which is hereby incorporated in total by reference; and U.S. Pat. No. 5,535,176. The conventional beam outputs are obtained by multiplying the narrowband data and replica fields by a steering vector at angle $\Theta$ measured broadside to the array, and summing the products over the phones A, $$A^{data}(\Theta) = \Sigma_j e^{-ikx_j \sin\Theta} p_j^{data} \quad (1)$$

$$A^{rplc}(\Theta, s) = \Sigma_j e^{-ikx_j \sin\Theta} p_j^{rplc}(s) \quad (2)$$

where $x_j$ is the coordinate of the j-th hydrophone, k is the wave number used in beamforming, $p_j$ is pressure for the conventional (data) or replica (rplc) fields at the jth hydrophone, and s denotes the source parameters, i.e., range, depth and bearing.

Matched beam ambiguity function is given by the correlation function of the data beams and replica beams, $$B(s) = \frac{\left|\int A^{rplc}(\Theta, s) A^{data}(\Theta) d\sin\Theta\right|^2}{[\int |A^{rplc}(\Theta, s)|^2 d\sin\Theta][\int |A^{data}(\Theta)|^2 d\sin\Theta]} \quad (3)$$

The above expression can be generalized to other array configurations. For example, for a spherical array, one has $$B(s) = \frac{\left|\int A^{rplc*}(\Omega, s) A^{data}(\Omega) d\Omega\right|^2}{[\int |A^{rplc}(\Omega, s)|^2 d\Omega][\int |A^{data}(\Omega)|^2 d\Omega]}. \quad (4)$$

where $\Omega$ denotes the solid angle in the look direction.

The adaptive beamforming used to null a strong interference source can be accommodated in matched beam processing by using the adaptive beam outputs, $$A^{data}(\Theta) = \Sigma_j e^{-ikx_j \sin\Theta} p_j^{data} \beta_j, \quad (5)$$

$$A^{rplc}(\Theta, s) = \Sigma_j e^{-ikx_j \sin\Theta} p_j(s) \beta_j, \quad (6)$$

where $\beta_j$ is the adaptive weighting coefficients applied to both the data and replica beams.

In matched beam processing, the conventional beams, which generally point to the wrong target bearing when the target is near endfire directions, are transformed into matched-beam outputs; the highest output beam points to the correct target bearing. The transformation is done by a matrix multiplication. This matrix multiplication is implemented as a post processor to the existing sonar processing software. This is illustrated by rewriting the numerator in Eq. (3) as follows $$B(\Theta_t) = \int A^{rplc}(\Theta, \Theta_t) A^{data}(\Theta) d\sin\Theta = \Sigma_i \alpha_i(\Theta_t) A^{data}(\Theta_i) \cos\Theta_i \quad (7)$$

where $\Theta_t$ is the bearing search angle and $$\alpha_i(\Theta_t) = A^{rplc}(\Theta_i, \Theta_t) = \Sigma_j e^{-ikx_j \sin\Theta_i} p_j^{rplc}(s) \quad (8)$$

where s denotes the range, depth and bearing ($\Theta_t$) of the replica source coordinates. Equation (7) shows that the transformation from the input beams $A^{data}(\Theta_i)$ to the output beam B ($\Theta_t$) is a matrix multiplication. The matrix $\alpha$ will be generated by the "post processor." The beam weighting coefficients are given by Equation (8).

Physically, $\alpha$ may be interpreted as a set of "steering vectors" which are multiplied with the data beams to form new beams. The steering vectors are composed of the replica beams which depend on the target search coordinates and can be precalculated under stationary conditions.

The simplest form of adaptive beamforming is rejection of directional noise by excluding certain beams from the matched beam correlation which contain the dominant noise. Only the beam containing the signals is needed and used in matched beam processing. Matched beam processing is a more efficient and robust approach to correct bearing errors and signal gain degradation of horizontal line arrays in shallow water than matched field processing.

It should be noted that range estimation based on a horizontal array is often limited. Accurate source localization requires exact environmental acoustic information using matched field processing. Matched beam processing estimates target bearing without requiring accurate range/depth localization, as bearing estimation can tolerate some degree of bottom mismatch and is more robust than range/depth estimation. Range is estimated after the target bearing is estimated. Both bearing and range estimation can be improved with an iterative procedure.

Figure 2:
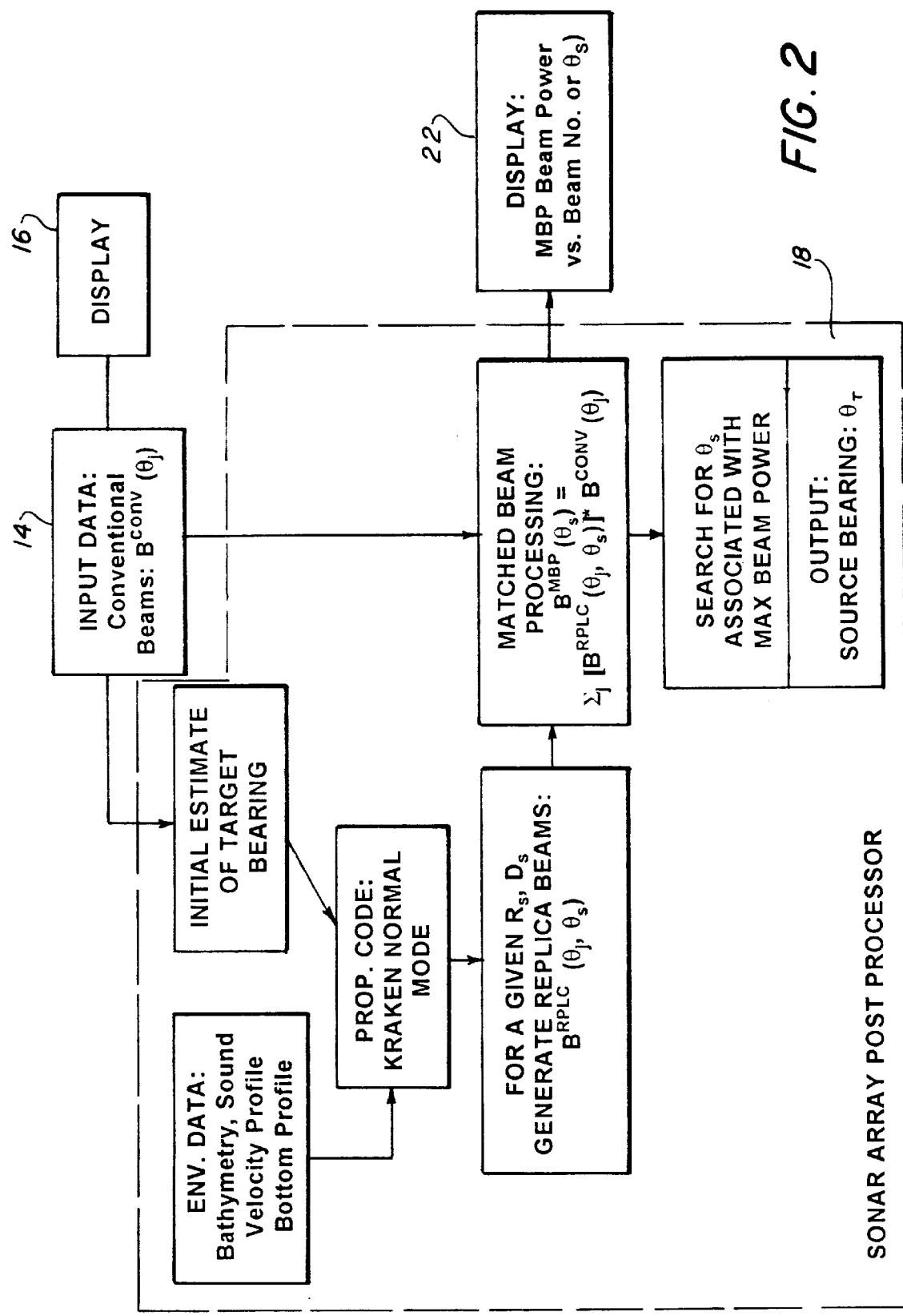
FIG. 2 shows a diagram for the matched beam processor.
Figure 3:
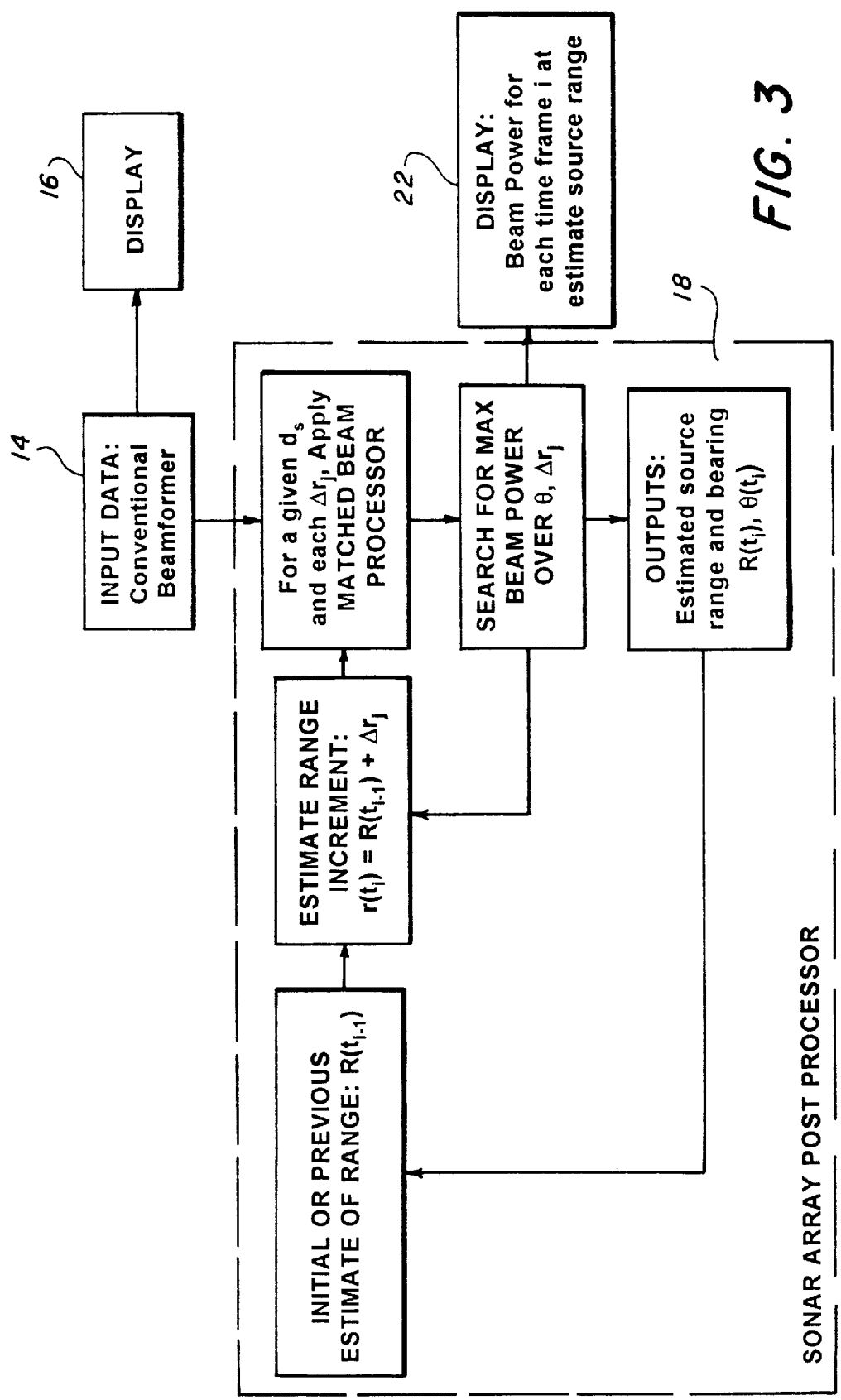
FIG. 3 shows a diagram for matched beam detection and tracking of a target.

Target detection and search procedures are illustrated in FIGS. 2 and 3. Target tracking using an iterative procedure in bearing and range estimation reduces significantly the computation load compared with matched field processing which search simultaneously bearing, range and depth in a three dimensional space.

Figure 4:
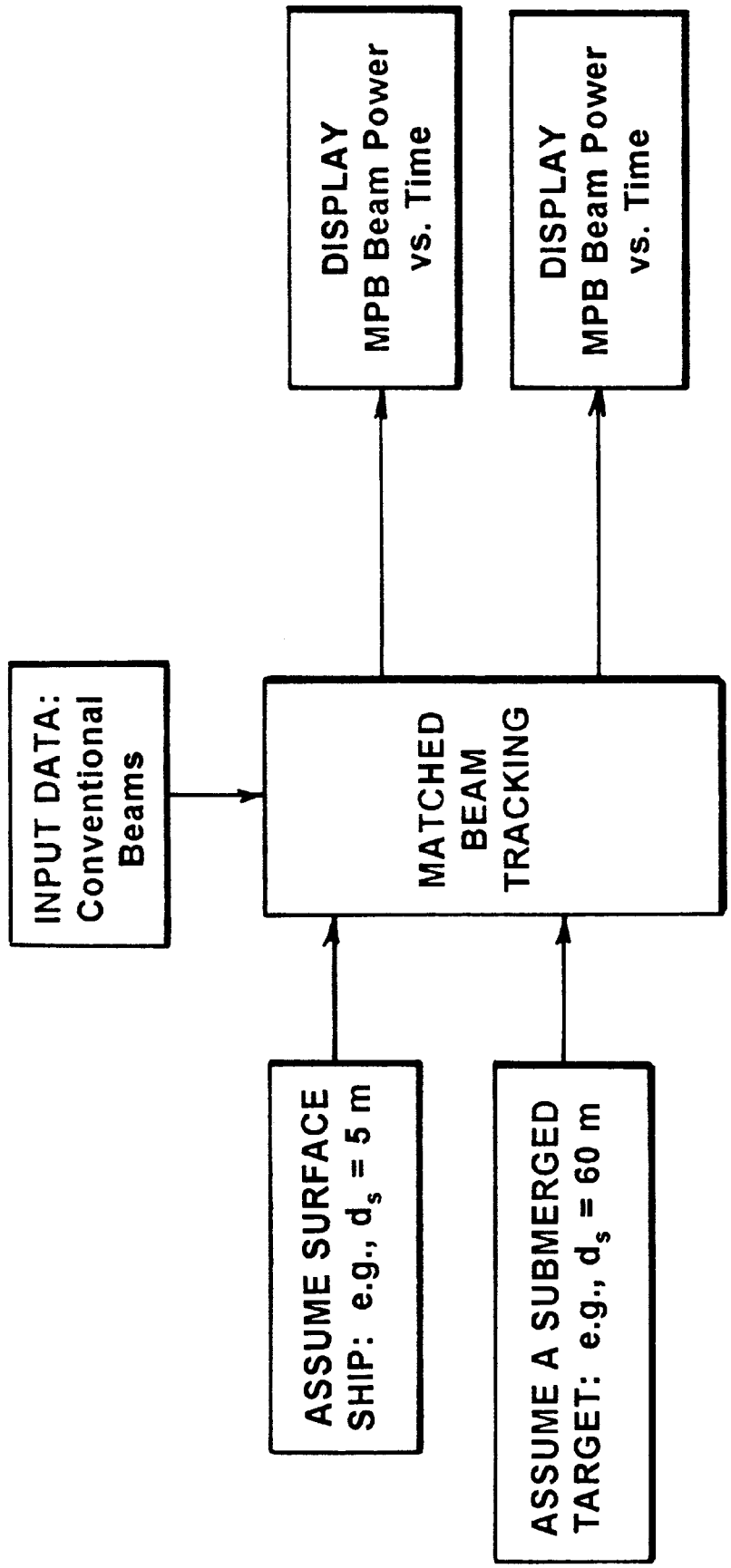
FIG. 4 shows a diagram for search for a submerged target by depth discrimination.

The horizontal array has some capability in discriminating a deep from a shallow target when sources are away from the broadside direction. Depth discrimination is illustrated in FIG. 4. The deep source is enhanced by the signal gain when the depth used in the replica field matches that of the target. The bearings of the shallow and deep sources are separately tracked which conventional beamforming fails to do when they are close to the endfire direction. Bearing estimation of both sources are more accurate than conventional beamforming.

Target tracking is done iteratively by searching for the new target bearing and range is incremented from the previous range. Depth is a parameter as mentioned above. The matched beam processor of FIG. 2 is employed to determine the new matched-beam beam output. New target bearing is determined from the matched-beam beam plots, and a new target range is searched for by the high beam power in range along the target bearing.

For target detection assuming unknown target position, several ranges centered around an educated estimation of target range (based on prior information, such as received level, known areas where target is not present, and inputs from other sensors) are used in the matched beam processor to estimate the target bearing. Consistence in the bearing distribution rather than the peak of the bearing plot will be used in the initial estimate of bearing. After bearing is determined, the processor searches for the target range along the bearing. This process is repeated iteratively, as necessary, until a high matched-beam output is obtained while maintaining consistence in the range and bearing estimation.

Target tracking is continuous even when the target is in endfire directions and provides depth discrimination whether the target is deep submerged or a surface vessel. Improved signal gain provided by the sonar array post processor results in extended detection range.

For classification of submerged target by depth discrimination, the matched beam detection and tracking processor is run in parallel using various depths in the replica field. The surface ships and submerged target will be enhanced when the replica depth matched that of the surface ships and the target.

Although the invention has been described in relation to an exemplary embodiment thereof, it will be understood by those skilled in the art that still other variations and modifications can be affected in the preferred embodiment without detracting from the scope and spirit of the invention as described in the claims.

APPENDIX 1

```
      PROGRAM FIELDR    ! single freq over range

INTEGER*4      PRTFIL, SDFIL, RDFIL, PRFIL
      PARAMETER      (PRTFIL=6, SDFIL=32, RDFIL=33,
     1                MAXM=100, MAXRD=50, PRFIL=7)
      REAL*4         SD, RD(MAXRD), RANGE,
     1               XX(MAXRD), YY(MAXRD), RR(MAXRD)
      COMPLEX*8      PHIS(MAXM), PHIR(MAXM,MAXRD),
     1               P(MAXRD)
      COMPLEX*8      CK(MAXM)
      CHARACTER      OPT*50, TITLE*80, FILNAM*20
      REAL*4         FREQ
      PARAMETER      (NFFT=512)
      COMPLEX*8      FFTC(NFFT*2)

M = 999
      F1 = 415.
      F1 = 380.
      DELTAT = .001
      SAMP = 1./DELTAT
      DELTAF = SAMP / (2.*FLOAT(NFFT))
      XLIM1 = F1 / DELTAF + .5
      IFREQ = XLIM1

C     Read source, rcvr depths and (optionally) rcvr displacements c     TYPE *, 'Enter array tilt'
c     READ *, ANGLE
      angle = 45.

READ (SDFIL,*) NSRCS, SD
      CLOSE (SDFIL)

READ (RDFIL,*) NRCVRS
      DO I=1,NRCVRS
          READ (RDFIL,*) XX(I), RD(I)
          XX(I) = YY(I) * COSD(ANGLE)
          YY(I) = YY(I) SIND(ANGLE)
      END DO
      CLOSE (RDFIL)
      IF (NRCVRS .GT. MAXRD)
     1     WRITE (PRTFIL,*) 'TOO MANY RECEIVER DEPTHS'

IPROF = 0

C     For computations read in modes
```

Inventor: Yang  
Serial No.

PATENT APPLICATION  
Navy Case No. 78,397

```
      c     M = 999
            read *, m
            WRITE (FILNAM,10) IFREQ
      10    FORMAT ('pd', i3.3, '.mod')
 5          type *, filnam
            IPROF = 0
            CALL GETMOD (IPROF, FILNAM, MAXM, SD, NRCVRS, 'N'
           1      CK, PHIS, M1, FREQ, TITLE)
            CALL GETMOD (IPROF, FILNAM, MAXM, RD, NRCVRS, 'N'
10         1      CK, PHIR, M1, FREQ, TITLE)
      c     m1 =2
            type *, freq. m1
            M = MIN(M, M1)
            type *, freq, m
15          WRITE (PRFIL,*) FREQ
            do irng=-4000.4000,32
                rangex = float(irng)
                rangey = 1000
      c         rangey = sqrt(4000.2 - rangex2)
20          tang = atan2d (rangey, rangex)
            range = sqrt(rangex**2 + (rangex**2)
            type *, range, tang
                DO I=1, NRCVRS
                    RR(I) = SQRT((RANGEX-XX(I))**2 + (RANGEY-YY(I))**2)
25                  if (RR(I) .EQ. 0.) RR(I)=1.e-20
                END DO
      c     type *, rr
                DO J=1, NSRCS
                    CALL EVAL  PHIS, PHIR, NRCVRS, RR,
30         1            CK, M, OPT, P)
                ENDDO
                WRITE (PRFIL,*) IRNG, RANGE, P
            ENDDO
35          END
```

23

Inventor: Yang  
Serial No.

PATENT APPLICATION  
Navy Case No. 78,397

APPENDIX 2

```
        PROGRAMFIELD2           ! single freq over range (second
       1                          source)
        INTEGER*4     SDFIL, RDFIL, PRFIL, PR1FIL
        PARAMETER     (SDFIL=32, RDFIL=33, PRFIL=8,
       1              MAXM=100, MAXRD=50, PRFIL=7)
        REAL*4        SD, RD(MAXRD), RANGE
       1              XX(MAXRD), YY(MAXRD), RR(MAXRD)
        COMPLEX*8     PHIS(MAXM), PHIR(MAXM, MAXRD)
       1              P(MAXRD), PRE(MAXRD)
        COMPLEX*8     CK(MAXM)
        CHARACTER     OPT*50, TITLE*80, FILNAM*20
        REAL*4        FREQ
        PARAMETER     (NFFT=512)

M=999
        read *, m
        F1 = 415.
        F1 = 380.
        DELTAT = .001
        SAMP = 1./DELTAT
        DELTAF = SAMP / (2.*FLOAT(NFFT))
        ALIM1 = F1 / DELTAF + .5
        IFREQ = XLIM1

C       Read source, rcvr depths and (optionally) rcvr displacements
c       TYPE *, 'Enter array tilt'
c       READ *, ANGLE
        angle = 45

READ (SDFIL,*) NSRCS, SD
        CLOSE (SDFIL)

READ (RDFIL.*) NRCVRS
        DO I=1,NRCVRS
            READ (RDFIL,*) XX(I), YY(I), RD(I)
            XX(I) = YY(I) * COSD(ANGLE)
            YY(I) = YY(I) * SIND(ANGLE)
        ENDDO
        CLOSE (RDFIL)
        IF (NRCVRS .GT. MAXRD)
       1      WRITE (6,*) 'TOO MANY RECEIVER DEPTHS'

IPROF = 0
C       For computations read in modes
```

Inventor: Yang
Serial No.

PATENT APPLICATION
Navy Case No. 78,397

```
    c   m = 999
        IPROF = 0
        WRITE (FILNAM,10) IFREQ
    10  FORMAT ('pd', i3.3, '.mod')
        type *, filnam
        CALL GETMOD (IPROF, FILNAM, MAXM, SD, NSRCS, 'N'
    1        CK, PHIS, M1, FREQ, TITLE)

CALL GETMOD (IPROF, FILNAM, MAXM, RD, NRCVRS, 'N',
    1        CK, PHIS, M1, FREQ, TITLE)
        M = MIN(M, M1)
        WRITE (PRFIL.*) FREQ
        READ (PRFIL,*) FRQ
        type *, freq, frq, m
        do irng=-2000,0,8
        do irng=0,2000,8
            READ (PR1FIL,*) JRNG, RANGE, PRE
            rangex = float(irng)
            rangey = 2000. + float(irng)
            rangey + 2000. - float(irng)
            range = sqrt(rangex**2 + rangey**2)
        type *, range, rangex, rangey
            DO I=1,NRCVRS
                RR(I) = SQRT((RANGEX-XX(I))**2 + (RANGEY-YY(I)**2)
                if (RR(I) .EQ. 0.) RR(I)=1,E-20
            ENDDO
            DO J=1,NSRCS
                CALL EVAL (PHIS, PHIR, NRCVRS, RR,
    1            CK, M, OPT, P)
            ENDDO
            DO I=1,nrcvrs
                P(I) = P(I) + PRE(I)
    c           P(I) = P(I) - 3.2*PRE(I)
    c           P(I) = P(I) = 1.6*PRE(I)
        ENDDO

END
```

Inventor: Yang  
Serial No.

PATENT APPLICATION  
Navy Case No. 78,397

APPENDIX 3

PROGRAM BEAM_FR

```
5    c    reads data< beamforming over frequency bins

IMPLICIT NONE

INTEGER*4      MAX_PHONE, NBEAM, NRCVRS, IRCV
10   c    PARAMETER      (MAX_PHONE=100, NBEAM-181)
          PARAMETER      (MAX_PHONE=50, NBEAM-181)
          REAL*4         X(MAX_PHONE), Y(MAX_PHONE), Z(MAX_PHONE)
          COMP,EX*8      PRES(MAX_PHONE)
          INTEGER*4      I, J, KK, KKK, ISKIP, NRECIN
15        INTEGER*4      IFRQ, IFREQ, LIM1, LIM2
          CHARACTER*80   FILNAM

REAL*4         SAMP, DLTAF, C0, FREQ, K0, asl
          REAL*4         ANGLE, ST, F1, F2, DELTAT, XLIM1, XLIM2
20        COMPLEX*8      STEER(MAX_PHONE,NBEAM)
          COMPLEX*8      DBEAMS(NBEAM), CI, spectra(512)

open (unit=3, file-'spect.400', status='old', readonly
          1       form-'formatted')
25        read (3,*) spectra
          close (3)

c    receiver depths 30   c    OPEN (UNIT=4, FILE='horz.ary', FORM='FORMATTED',
          OPEN (UNIT=4, FILE='bott.ary', FORM='FORMATTED',
          1       READONLY, STATUS='OLD')
          READ (4,*) NRCVRS
          IF (NRCVRS .GT. MAX_PHONE)
35        1       WRITE (6.*) 'ERROR IN NUMBER OF PHONES'
          DO IRCV=1,NRCVRS
             READ (4,*) X(IRCV), Y(IRCV), Z(IRCV)
          END DO
          CLOSE (4)
40
          filnam = 'pres_s150_r1000_a45.dat'
          type *, filnam
          TYPE *, 'Enter filename'
          READ 10, FILNAM
45   10   FORMAT (A)
          OPEN (UNIT=1, FILE-FILNAM, STATUS='OLD', FORM='FORMATTED')

F1 = 351.
```

26

Inventor: Yang
Serial No.

PATENT APPLICATION
Navy Case No. 78,397

```
           F2 = 449.
           DELTAT = .001
           SAMP = 1./DELTAT
           DELTAF = SAMP / 1024
 5         XLM1 = F1 / DELTAF + 5
           LIM1 = XLM1              ! 359 (350.6 hZ)
           XLIM2 = F2 / DELTAF + .5
           LIM2 = XLIM2
           type *, lim1, lim2
10
           DO IFREQ=LIM1, LIM2
              READ(1,*) IFRQ, FREQ, PRES
           type *, freq
              asl = 0.
15         DO IRCV=1,NRCVRS
              asl = asl + abs(pres(ircv))
           end do C     calculate steering vector
20
           C0 = 1437.
           C0 = 1500.
           CI = CMPLX(0.,1.)
           k0 = 2. * 3.14149265 * FREQ / C0
25         DO I=1,NBEAM
              ANGLE = FLOAT(I-1) - 90.
              ST = K0 * SIND(ANGLE)
              DO IRCV=1,NRCVRS
                 STEER(IRCV,I) = EXP(CI*Y(IRCV)*ST)
30            END DO
           END DO CALL BEAM_FORM (DBEAMS, PRES, NRCVRS, STEER)
           do i=1,nbeam
35    c       dbeams(i) = dbeams(i) * spectra(ifreq-1)
              dbeams(i) = dbeams(i) / asl
           end do
           WRITE (7,*) DBEAMS
           END DO
40         CLOSE(1)

END
```

27

Inventor: Yang  
Serial No.

PATENT APPLICATION  
Navy Case No. 78,397

APPENDIX 4

```
 5       PROGRAM BEAM_FR c   reads data, beamforming over frequency bins

IMPLICIT NONE
10
         INTEGER*4      MAX_PHONE, NBEAM, NRCVRS, IRCV
         PARAMETER      (MAX_PHONE=100, NBEAM=181)
         PARAMETER      (MAX_PHONE=50, NBEAM=181)
         REAL*4         X(MAX_PHONE), Y(MAX_PHONE), Z(MAX_PHONE)
15       COMPLEX*8      PRES(MAX_PHONE)
         INTEGER*4      I, J, KK, KKK, ISKIP, NRECIN
         INTEGER*4      IFRQ, IFREQ, LIM1, LIM2
         CHARACTER*80   FILNAM

20       REAL*4         SAMP, DELTAF, C0, FREQ, K0, asl
         REAL*4         ANGLE, ST, F1, F2, DELTAT, XLIM1, XLIM2
         COMPLEX*8      STEER(MAX_PHONE,NBEAM)
         COMPLEX*8      DBEAMS(NBEAM), CI, spectra(512)

25       open (unit=3, file='spect.400', status='old', readonly,
       1       form='formatted')
         read (3,*) spectra
         close (3)

30   c   receiver depths c   OPEN (UNIT=4, FILE='horz.ary', FORM='FORMATTED',
         OPEN (UNIT=4, FILE='bott.ary', FORM='FORMATTED',
       1       READONLY, STATUS='OLD')
35       READ (4,*) NRCVRS
         IF (NRCVRS .GT. MAX_PHONE)
       1       WRITE (6,*) 'ERROR IN NUMBER OF PHONES'
         DO IRCV=1, NRCVRS
             READ (4,*) X(IRCV), Y(IRCV), Z(IRCV)
40       END DO
         CLOSE (4)

filnam = 'pres_s150_r1000_a45.dat'
         type *, filnam
45       TYPE *, 'Enter filnam'
         READ 10, FILNAM
      10 FORMAT (A)
         OPEN (UNIT=1, FILE=FILNAM, STATUS='OLD', FORM='FORMATTED')
```

28

Inventor: Yang  
Serial No.

PATENT APPLICATION  
Navy Case No. 78,397

```
            F1 =351.
            F2 = 449.
            DELTAT = .001
            SAMP = 1./DELTAT
     5      DELTAF = SAMP / 1024.
            XLIM1 = F1 / DELTAF + .5
            LIM1 = XLIM1              ! 359 (350.6 hZ)
            XLIM2 = F2 / DELTAF + .5
            LIM2 = XLMI2              ! 460 (449.2 hZ)
    10      type *, lim1, lim2

DO IFREQ=LIM1, LIM2
                READ(1,*) IFRQ, FREQ, PRES
            type *, freq
    15         asl = 0.
               DO IRCV=1, NRCVRS
               END DO c    calculate steering vector
    20
               C0 = 1437.
               C0 = 1500.
               CI = CMPLX(0.,1.)
               K0 = 2. * 3.14159265 * FREQ / C0
    25         DO I=1,NBEAM
                   ANGLE = FLOAT(I-1) - 90.
                   ST = K0 * SIND(ANGLE)
                   DO IRCV=1, NRCVRS
                       STEER(IRCV,I) = EXP(CI*Y(IRCV)*ST)
    30             END DO CALL BEAM_FORM (DBEAMS, PRES, NRCVRS, STEER)
                   do i=1, nbeam
       c               dbeams(i) = dbeams(i) * spectra(ifreq-1)
    35                 dbeams(i) = dbeams(i)   asl
                   end do
                   WRITE (7,*) DBEAMS
            END DO
            CLOSE(1)
    40
            END
```

29

Inventor: Yang  
Serial No.

PATENT APPLICATION  
Navy Case No. 78,397

APPENDIX 5

```
     c     PROGRAM MBEAM_fr       ! over frequency
 5
           INTEGER*4      RDFIL, COM_FILE
           PARAMETER      (RDFIL=43, COM_FILE=40
          1               MAXP=100, MAXB=181, IOUT_FILE=50, NMODE=128)
          1               MAXP=50, MAXB=181, IOUT_FILE=50, NMODE=128)
10         REAL*4         RD, RANGE, SDEP, XX, YY(MAXP), ZZ, K0
          1               SUMR, SUMD, MBEAM(MAXB)
           COMPLEX*8      P(MAXP), REP(MAXP), CI, TEMP, PI4
           PARAMETER      (NFFT=512, CI=(0.,1.))
           COMPLEX*8      SUMDR, ARPL, ADATA(129), PEXP(MAXP,129)
15         COMPLEX*8      F(NMODE), E(NMODE), CONST(MAXP,NMODE)
           COMPLEX*16     CK(NMODE)
           REAL*8         FREQ
           CHARACTER*80   TITLE
           CHARACTER*2    mext
20
           F1 = 351.
           F2 = 449.
           DELTAT = .001
           SAMP = 1./DELTAT
25         DELTAF = SAMP / (2.*FLOAT(NFFT))
           XLIM1 = F1 / DELTAF + .5
           LIM1 = XLIM1            ! 359 (350.6 hZ)
           XLIM2 = F2 / DELTAF + .5
           LIM2 = XLIM2            ! 460 (449.2 hZ)
30         type *, lim1, lim2
           TYPE *, 'Enter mode file prefix'
           READ 10, MEXT
     10    FORMAT (A)
           TYPE *, 'Enter range, depth'
35         READ *, RR, SDEP READ (RDFIL,*) NRCVRS   ! receiver configuration
           DO IP=1,NRCVRS
                READ (RDFIL,*) XX, YY(IP), ZZ
40         END DO
           CLOSE (RDFIL)
           IF (NRCVRS .GT. MAXP) WRITE (6,*) 'TOO MANY RECEIVERS'

C0 = 1500.
45         PI = 3.14159265
           PI4 = CI * PI * .25

OPEN (UNIT=COM_FILE, FORM='FORMATTED', READONLY,   1
```

30

Inventor: Yang  
Serial No.

PATENT APPLICATION  
Navy Case No. 78,397

```
      STATUS='OLD')
          DO JFREQ=LIM1, LIM2
              READ (COM_FILE,*) IFR, XFRQ, (P(IP), IP=1,NRCVRS)
              FREQ = FLOAT(JFREQ) * DELTAF
 5            OMEGA = 2. * PI * FREQ
              K0 = OMEGA / C0
          type *, xfrq, freq, k0

SUMD = 0.
10            DO ID=1,129
                  DSIN = FLOAT(ID-1)/64. - 1.
                  THETA - ASIND(DSIN)
                  ADATA(ID) = CMPLX(0.,0.)
                  DO IP=1,NRCVRS
15                    PEXP(IP,ID) = EXP(-CI*K0*YY(IP)*DSIN)
                      ADATA(ID) = ADATA(ID) + PEXP(IP,ID) * P(IP)
                  END DO
                  SUMD = SUMD + ABS(ADATA(ID))**2
              END DO
20
              M = 999
              CALL GETMODE (JFREQ, CK, E, M, ZZ, 1, FREQ, TITLE,
          1       NMODE, MEXT)        ! modes at receiver depths
              M = 50
25            DO MODE=1,M             ! horizontal array (1 depth)
                  E(MODE) = E(MODE) * SQRT(PI*2.) / SQRT(CK(MODE))
              END DO CALL GETMODE (JFREQ, CK, F, M, SDEP, 1, FREQ
30        1       TITLE, NMODE, mext)  !modes at search depths
              M = 50
              M = MIN(NMODE, M)
              WRITE (6,*) 'FREQUENCY OF INPUT DATA = ',FREQ, XFRQ, M 35            DO IB=1,MAXB
                  BEAR = FLOAT(IB-1) -90
                  DX = RR * COSD(BEAR)
                  DO MODE=1,M
                      DO IP=1,NRCVRS
40                        DY = RR * SIND(BEAR) - YY(IP)
                          DY = RR * SIND(BEAR) + YY(IP)
                          RX = SQRT (DX**2 + DY**2)
                          TEMP = -CI * CK(MODE) * RX - PI4
                          CONST(IP,MODE) = EXP(TEMP) *
45        1                   E(MODE) / SQRT(RX)
                      END DO
                  END DO
                  SUMDR = CMPLX(0.,0.)
```

31

Inventor: Yang  
Serial No.

PATENT APPLICATION  
Navy Case No. 78,397

```
            SUMDR = 0.
            DO ID=1,129
                DSIN = FLOAT(ID-1)/64. -1.
                ARPL = CMPLX(0.,0.)
                DO IP=1,NRCVRS
                    ARPL = ARPL + PEXP(IP,ID) * ADATA(ID)
                END DO
                SUMDR = SUMDR + conjg(ARDL) * ADATA(ID)
                SUMR = SUMR + ABS(ARPL)**2
            END DO
            MBEAM(IB) = ABS(SUMDR)**2 / (SUMR * SUMD)
        END DO
        WRITE (IOUT_FILE,*) MBEAM
    END DO
    CLOSE (COM_FILE)
    CLOSE (IOUT_FILE)

STOP
    END
```

Inventor: Yang  
Serial No.

PATENT APPLICATION  
Navy Case No. 78,397

APPENDIX 6

```
   c    PROGRAM MBEAM_range        ! over range

5       INTEGER*4       RDFIL, COM_FILE
        PARAMETER       (REFIL=23, COM_FILE=20
       1                MAXP=50, MAXB=181,IOUT_FILE=60, NMODE=128)
        REAL*4          RD, RANGE, SDEP, XX(MAXP). YY(MAXP) ZZ, KO,
       1                SUMR, SUMD, MBEAM(MAXB)
10      COMPLEX*8       P(MAXP), REP(MAXP), CI, TEMP, PI4
        PARAMETER       (NFFT=512, CI=(0.,1.))
        COMPLEX*8       SUMDR, ARPL, ADATA(65), PEXP(MAXP,65)
        COMPLEX*8       F(NMODE), E(NMODE)
        COMPLEX*16      CK(NMODE)
15      REAL*8          FREQ
        CHARACTER*80    TITLE
        CHARACTER*2     mext F1 = 415.
20      F1=380.
        DELTAT = .001
        SAMP = 1./DELTAT
        DELTAF = SAMP / (2.*FLOAT(NFFT))
        XLIM1 = F1 / DELTAF + .5
25      JFREQ = XLIM1
        TYPE *, 'Enter mode file prefix'
        READ 10, mext
    10  FORMAT (A)
        TYPE *, 'Enter source depth'
30      READ *, SDEP READ (RDFIL,*) NRCVRS   ! receiver configuration
        DO IP=1, NRCVRS
            READ (RDFIL,*) XX(IP), YY(IP), ZZ
35      END DO
        CLOSE (RDFIL)
        IF (NRCVRS .GT. MAXP) WRITE (6,*) 'TOO MANY RECEIVERS'

C0 = 1500.
40      PI = 3.14159265
        PI4 = CI * PI * .25

OPEN (UNIT=COM_FILE, FORM='FORMATTED', READONLY,
       1      STATUS='OLD')
45      READ (COM_FILE,*) XFRQ
        FREQ = FLOAT(JFREQ) * DELTAF
        OMEGA = 2. * PI * FREQ
        K0 = OMEGA / C0
```

Inventor: Yang  
Serial No.

PATENT APPLICATION  
Navy Case No. 78,397

```
      type *, xfrq, frq, k0
      M = 999
      CALL GETMODE (JFREQ, CK, E, M, ZZ, 1, FREQ, TITLE,
     1    NMODE, mext)             ! modes at receiver depths CALL GETMODE (JFREQ, CK, F, M, SDEP, 1, FREQ,
     1    TITLE, NMODE, mext) ! modes at search depths
      M = MIN(NMODE, M)
      WRITE (6,*) ' FREQUENCY OF INPUT DATA = ',FREQ, XFRQ,M DO MODE=1,M              ! horizontal array (1 depth)
         E(MODE) = E(MODE) * F(MODE) * SQRT(PI*2.) /
     1        SQRT(CK(MODE))
      END DO DO ID=1,65
         DSIN = FLOAT(ID-1)/32. - 1.
         THETA = ASIND(DSIN)
         DO IP=1,NRCVRS
            PEXP(IP,ID) = EXP(-CI*K0*YY(IP)*DSIN)
         END DO
      END DO DO IRNG=-4000,4000,32
         READ (COM_FILE,*) JRNG, RANGE, (P(IP), IP=1,NRCVRS)
c        range = 1400.
         xrange = float(irng)
         yrange = 1000.
         range = sqrt(xrange**2 + yrange**2)
         SUMD = 0.
         DO ID=1,65
            ADATA(ID) = CMPLX(0.,0.)
            DO IP=1,NRCVRS
               ADATA(ID) = ADATA(ID) + PEXP(IP,ID) * P(IP)
            END DO
            SUMD = SUMD + ABS(ADATA(ID))**2
         END DO type *, range
         DO IB=1,maxb
            BEAR = 90. - FLOAT(IB-1)
            DO IP=1, NRCVRS
               DX = XX(IP) - RANGE * COSD(BEAR)
               DY = YY(IP) - RANGE * SIND(BEAR)
               RX = SQRT (DX**2 + DY**2)
               if (rx .eq. 0) rx = 1,e-20
               REP(IP) = CMPLX(0.,0.)
               DO MODE=1,M
```

Inventor: Yang  PATENT APPLICATION
Serial No.  Navy Case No. 78,397

```
                    TEMP = -CI * CK(MODE) * RX - PI4
                    REP(IP) = REP(IP) + EXP(TEMP) * E(MODE)
   1                       / SQRT(RX)
                END DO
            END DO
            SUMDR = CMPLX(0.,0.)
            SUMR = 0.
            DO ID=1,65
                DSIN = FLOAT(ID-1)/32. - 1.
                ARPL = CMPLX(0.,0.)
                DO IP=1, NRCVRS
                    ARPL = ARPL + PEXP(IP,ID) * REP(IP)
                END DO
                MBEAM(IB) = ABS(SUMDR)**2/ (SUMR * SUMD)
            END DO
            WRITE (IOUT_FILE,*) MBEAM
      type *, mbeam(1)
      END DO
      CLOSE (COM_FILE)
      CLOSE(IOUT_FILE)

STOP
      END
```

Inventor: Yang  
Serial No.

PATENT APPLICATION  
Navy Case No. 78,397

APPENDIX 7

```
      SUBROUTINE EVAL (C, PHI, NZ, RR, CK, M, IOPT, P)

5    C  Given modes and wavenumbers, compute pressure field
      C  normalized to pressure of point source at 1 meter
      C  IOPT = X    for cartesian (X,Z) coordinates
      C  IOPT = R    for cylindrical (R,Z) coordinates
      C  IOPT = S    for scaled cylindrical coordinates
10    C              (1/R fall-off removed for shade plotting)

COMPLEX*8      CI
         PARAMETER      (MAXM=100, CI=(0.0,1.0), PI=3.14159265)
         REAL*4         RR(NZ)
15       COMPLEX*8      C(M), PHI(MAXM,NZ), CONST(MAXM), HANK(MAXM),
        1               P(NZ), CICK(MAXM), PI4, PEXP
         COMPLEX*8      CK(M)
         CHARACTER*50   IOPT

20    C  Initialization

P12 = SQRT(2.0*PI)
         P14 = CI * .25 * PI
         DO MODE=1,M
25          IF ( IOPT(1:1) .EQ. 'X' ) THEN
                CONST(MODE) = PI2*C(MODE)
            ELSE
                CONST(MODE) /SQRT(CK(MODE))
            ENDIF
30          CICK(MODE) = -CI*CK(MODE)
         ENDDO

C  Loop over phone

35       DO IZ=1,NZ
            P(IZ) = (0.0, 0.0)
            DO MODE=1,M
               if (aimg(cick(mode)*rr(iz)) .gt. 31415.)
        1         type *, iz, mode, ' exp error'
40    C        HANK(MODE) = CONST(MODE) * EXP(CICK MODE)*RR(IZ) -
        1      PI4)
               HANK(MODE) = CONST(MODE) * EXP(CICK(MODE)*RR(IZ))
               P(IZ) = P(IZ) + PHI(MODE,IZ)*HANK(IZ))
            ENDDO
45          P(IZ) = P(IZ) / SQRT(RR(IZ))
         ENDDO

RETURN
```

36

Inventor: Yang
Serial No.

END

PATENT APPLICATION
Navy Case No. 78,397

Inventor: Yang
Serial No.

PATENT APPLICATION
Navy Case No. 78,397

APPENDIX 8

```
      SUBROUTINE BEAM_FORM (BEAM, PRES, NRCV, STEER)

5     PARAMETER       (NBEAMS-181)

COMPLEX*8       PRES(NRCV), BEAM(NBEAMS), STEER(NRCV,NBEAMS)

DO IBEAM=1,NBEAMS
10       BEAM(IBEAM) = CMPLX(0.,0.)
         DO IRCV=1,NRCV
             BEAM(IBEAM)= BEAM(IBEAM) +
1            PRES(IRCV)*STEER(IRCV,IBEAM)
         END DO
15    END DO

RETURN
      END
```

Inventor: Yang  
Serial No.

PATENT APPLICATION  
Navy Case No. 78,397

APPENDIX 9

```
      SUBROUTINE GETMODE (IFREQ, CK, PHIR, M, NRCVRS, FREQ
     1       TITLE, NMODE, mext)

C     for a given profil number, read in modes and
C     extract values at rcvr depths INTERGER*4      PRTFIL, MODFIL
      PARAMETER       (MAXN=850, MAXM=128)
      REAL*4          ZMODE(MAXN), RD(NRCVRS)
      COMPLEX*8       PHI(MAXN), PHIR(NRCVRS,NMODE)
      COMPLEX*16      CK(MAXM)
      CHARACTER*80    TITLE
      CHARACTER*40    FNAME
      CHARACTER*2     mext
      REAL*8          FREQ C     Read modal data MODFIL = 30
      write (fname,10) mwxt, ifreq
  10  format (a2, i3.3, '.mod')
      type *, fname
      OPEN (UNIT=MODFIL, FORM='UNFORMATTED', STATUS='OLD'
     1     ACCESS='DIRECT', RECL=23, file=fname)
      READ  MODFIL, REC=1) TITLE, FREQ, LRECL
      CLOSE (UNIT=MODFIL)

OPEN (UNIT=MODFIL, FORM='UNFORMATTED', STATUS='OLD',
     1     ACCESS='DIRECT', RECL=LRECL, file=fname)
      READ (MODFIL,REC=1) TITLE, FREQ
      READ (MODFIL,REC=2) M, (CK(I) ,I=1,M)
      IF (M .GT. MAXM) TYPE *, M, ' M too large'
      READ (MODFIL;, REC=3) N
      IF (N .GT MAXN) TYPE *, N, ' N too large'
      READ (MODFIL,REC=4)   (ZMODE(J),J=1,N)

C     read in eigenfunctions and extract receiver values

IREC = 4
c     mm = m
      DO I=1,M
         phase_vel = 2. * 3.14159265 * freq / real(ck(i))
c        if (phase_vel .gt. 2200.) then
c           mm = i-1
c           go to 20
c        end if
```

39

Inventor: Yang  
Serial No.

PATENT APPLICATION  
Navy Case No. 78,397

```
              IREC = IREC + 1
              READ (MODFIL,REC=IREC) (PHI(J),J=1,N)
              DO J=1,NRCVRS
        C     --------          Locate index of receiver point
5               DO L=1,N
                    IF (RD(J) .GE. ZMODE(L)) IRD = L
                ENDDO
                T = (RD(J)-ZMODE(IRD))/(ZMODE(IRD+1)-ZMODE(IRD))
                PHIR(J,I) = (1.0-T)*PHI(IRD)+T*PHI(IRD+1)
10      c     if (phase_vel .lt. 1600.) phir(j,I) = cmplx(0.,0.)
              ENDDO
        ENDDO
        continue
        m = mm
15      CALL CLOSE(MODFIL)

RETURN
        END
```

Inventor: Yang  
Serial No.

PATENT APPLICATION  
Navy Case No. 78,397

APPENDIX 10

```
      SUBROUTINE BEAM_FORM (BEAM, PRES, NRCV, STEER)
5
      PARAMETER      (NBEAMS=181)

COMPLEX*8      PRES(NRCV) , BEAM(NBEAMS) ,
     1               STEER(NRCV,NBEAMS
10
      DO IBEAM=1,NBEAMS
         BEAM(IBEAM) = CMPLX(0.,0.)
         DO IRCV=1,NRCV
            BEAM(IBEAM) = BEAM(IBEAM) +
15   1      PRES(IRCV)*STEER(IRCV,IBEAM)
         END DO
      END DO

RETURN
20    END
```

Inventor: Yang
Serial No.

PATENT APPLICATION
Navy Case No. 78,397

APPENDIX 11

```
         SUBROUTINE GETMORE (IFREQ, CK, PHIR, M. RD,NRCVRS, FREQ,
        1       TITLE, NMODE, mext)

C    For a given profil number< read in modes and
    C    extract values at rcvr depths INTEGER*4      PRTFIL, MODFIL
         PARAMETER      (MAXN=3000. MAXM=128)
         REAL*4         ZMODE(MAXN), RD(NRCVRS)
         COMPLEX*8      PHI(MAXN), PHIR(NRCVRS,NMODE)
         COMPLEX*16     CK(MAXM)
         CHARACTER*80   TITLE
         CHARACTER*40   FNAME
         CHARACTER*2    mext
         REAL*8         FREQ C    Reads modal data MODFIL = 30
         write (fname,10) mext, ifreq
    10   format (a2,i3.3. '.mod')
         type *, fname
         OPEN (UNIT=MODFIL, FORM='UNFORMATTED', STATUS='OLD'
        1      ACCESS='DIRECT', RECL=23, file=fname)
         READ (MODFIL,REC=1) TITLE, FREQ
         CLOSE (UNIT=MODFIL)

OPEN (UNIT=MODFIL, FORM='UNFORMATTED', STATUS='OLD',
        1      ACCESS='DIRECT', RECL=LRECL, file=fname)
         READ (MODFIL,REC=1) TITLE, FREQ
         READ (MODFIL,REC=2) M, (CK(I),I=1,M)
         IF (M .GT. MAXN) TYPE *, M, ' M too large'
         READ (MODFIL,REC=3) N
         IF (N .GT. MAXN) TYPE *, N, ' N too large'
         READ (MODFIL,REC=4) (ZMODE(J), J=1,N)

C    Read in eigenfunctions and extract receiver values

IREC = 4
    c    mm = m
         DO I=1,M
               phase_vel = 2. * 3.14159265 * freq / real(ck(i))
    c        if (phase_vel .GT. 2200.) then
    c           mm = i-1
    c           go to 20
    c        end if
```

42

Inventor: Yang
Serial No.

PATENT APPLICATION
Navy Case No. 78,397

```
              IREC = IREC + 1
              READ (MODFIL, REC=IREC) (PHI(J),J=1.N)
              DO J=1, NRCVRS
      C       --------    Locate index of receiver point
 5              DO L=1,N
                  IF (RD(J) .GE. ZMODE(L)) IRD = L
                ENDDO
                T = (RD(J)-ZMODE(IRD))/(ZMODE(IRD+1)-ZMODE(IRD))
                PHIR(J,I) = (1.0-T)*PHI(IRD)+T*PHI(IRD+1)
10    c       if (phase_vel .lt. 1600.) phir(j<i) = cmplx(0.,0.)
              ENDDO
            ENDDO
            continue
            m = mm
15          CALL CLOSE(MODFIL)

RETURN
            END
```

What is claimed is:

1. An acoustic signal processor system comprising:

means for detecting an acoustic signal at a predetermined time;

means for processing the acoustic signal to obtain a conventional beamforming vector;

means for computing a beam weighting coefficient to be applied to the conventional beamforming vector producing a complex beam vector for both the conventional beam and a replica field for source localization to determine matched beam power; and means for displaying matched beam power versus time.

2. An acoustic signal processor, as in claim 1, wherein the means for detecting an acoustic signal at a predetermined time is a hydrophone.

3. An acoustic signal processor, as in claim 1, wherein the means for processing the acoustic signal to obtain a conventional beamforming vector is a computer.

4. An acoustic signal processor, as in claim 1, wherein the means for computing a beam weighting coefficient to be applied to the conventional beamforming vector producing a complex beam vector for both the conventional beam and a replica field for source localization to determine matched beam power is a computer.

5. An acoustic signal processor, as in claim 1, wherein the means for displaying matched beam power versus time is a video display.

6. An acoustic signal processor comprised of:

a hydrophone for detecting an acoustic signal from a target having a specific range, bearing and depth;

a computer for computing a conventional beamforming vector from the acoustic signal;

a computer for computing a beam weighting coefficient to be applied to the conventional beamforming vector resulting in a complex beam vector for both the conventional beam and a replica field for source localization to determine matched beam power; and a video display for displaying matched beam power versus time.

7. A method for determining an underwater objects specific range, bearing and depth, comprising the steps of;

detecting an acoustic signal at a predetermined time;

processing the acoustic signal to obtain a conventional beamforming vector;

computing a beam weighting coefficient to be applied to the conventional beamforming vector resulting in a complex beam vector for both the conventional beam and a replica field for source localization to determine matched beam power; and displaying matched beam power versus time.

8. A method for computing a beam weighting coefficient for determining an underwater objects range, bearing and depth comprising the following steps:

determining an acoustic signal at a predetermined time;

processing the acoustic signal to obtain a conventional beamforming vector;

computing a beam weighting coefficient to be applied to the conventional beamforming vector producing a complex beam vector for both the conventional beam and a replica field for source localization to determine matched beam power; and displaying the matched beam power versus time.

* * * * *